(12) United States Patent
Rambo et al.

(10) Patent No.: US 12,116,956 B2
(45) Date of Patent: Oct. 15, 2024

(54) AMMONIA BASED HYDROGEN POWERED COMBINED PROPULSION SYSTEM

(71) Applicant: General Electric Company, Schenectady, NY (US)

(72) Inventors: Jeffrey D. Rambo, Mason, OH (US); Scott G. Edens, Milford, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/065,143

(22) Filed: Dec. 13, 2022

(65) Prior Publication Data
US 2024/0191675 A1   Jun. 13, 2024

(51) Int. Cl.
*F02K 7/16* (2006.01)
*F02C 3/20* (2006.01)
*F02C 6/00* (2006.01)

(52) U.S. Cl.
CPC ............ *F02K 7/16* (2013.01); *F02C 3/20* (2013.01); *F02C 6/00* (2013.01)

(58) Field of Classification Search
CPC ............. F02C 3/20; F02C 3/30; F02K 7/16
See application file for complete search history.

(56) References Cited

U.S. PATENT DOCUMENTS

| 3,198,604 A * | 8/1965 | Pfefferle | C01B 3/047 423/658.2 |
| 3,705,496 A * | 12/1972 | Wolf | F02K 3/02 60/267 |
| 3,733,826 A * | 5/1973 | Wolf | F02C 7/08 60/768 |
| 3,740,949 A * | 6/1973 | Wolf | F02C 7/224 60/267 |
| 3,777,487 A | 12/1973 | Norman et al. | |

(Continued)

FOREIGN PATENT DOCUMENTS

| CN | 114922740 A | 8/2022 |
| FR | 2687433 A1 | 8/1993 |

(Continued)

OTHER PUBLICATIONS

David et al., "Hydrogen Production from Ammonia Using Sodium Amide," Journal of the American Chemical Society, vol. 136, Issue 28, p. 13082-13085 (2014) and Supporting Information for: Hydrogen Production from Ammonia Using Sodium Amide, p. S1-S8.

(Continued)

*Primary Examiner* — Ted Kim
(74) *Attorney, Agent, or Firm* — Venable LLP; Edward A. Kmett; Michele V. Frank

(57) ABSTRACT

A propulsion system includes a turbine engine, and a ramjet engine arranged in parallel with the turbine engine, a fuel storage tank that stores a fuel, such as an ammonia-based fuel, a heat exchanger through which the fuel passes to obtain gaseous (or supercritical) fuel components of the fuel, and a separator that separates the gaseous fuel components into a first fuel component and a second fuel component. The first fuel component is provided to the ramjet engine for ramjet combustion and/or to the turbine engine for turbine combustion, in a high speed operating state of the propulsion system, while the second fuel component may be provided to an inlet of the turbine engine for the turbine combustion.

19 Claims, 11 Drawing Sheets

(56) References Cited

U.S. PATENT DOCUMENTS

| | | | | |
|---|---|---|---|---|
| 3,792,584 | A * | 2/1974 | Klees | F02K 3/075 |
| | | | | 60/226.3 |
| 3,811,280 | A | 5/1974 | Wharton et al. | |
| 4,667,900 | A * | 5/1987 | Kim | F02K 3/08 |
| | | | | 137/15.1 |
| 5,085,048 | A | 2/1992 | Kutschenreuter et al. | |
| 5,216,876 | A * | 6/1993 | Gabrielson | F02C 3/22 |
| | | | | 60/737 |
| 5,394,685 | A * | 3/1995 | Kesten | F02C 3/20 |
| | | | | 60/768 |
| 5,459,994 | A * | 10/1995 | Drnevich | F02C 3/30 |
| | | | | 60/39.12 |
| 6,644,015 | B2 * | 11/2003 | McKinney | F02K 9/78 |
| | | | | 60/767 |
| 2010/0242437 | A1 | 9/2010 | Jarmon | |
| 2015/0275762 | A1 * | 10/2015 | Kenyon | F02K 3/075 |
| | | | | 60/39.17 |
| 2015/0315971 | A1 * | 11/2015 | Reitz | F02C 7/224 |
| | | | | 60/39.461 |
| 2018/0017017 | A1 * | 1/2018 | Tomlinson | F02K 7/16 |
| 2019/0293024 | A1 | 9/2019 | Carter | |
| 2020/0398240 | A1 * | 12/2020 | Jiang | B01J 23/755 |
| 2022/0162989 | A1 | 5/2022 | Cocks et al. | |
| 2022/0162999 | A1 | 5/2022 | Cocks et al. | |
| 2022/0389884 | A1 * | 12/2022 | Burd | F02K 7/10 |

FOREIGN PATENT DOCUMENTS

| | | |
|---|---|---|
| FR | 3127269 A1 | 3/2023 |
| FR | 3130896 A1 | 6/2023 |
| FR | 3130897 A1 | 6/2023 |
| FR | 3133367 A1 | 9/2023 |
| FR | 3133368 A1 | 9/2023 |
| GB | 800871 A | 9/1958 |
| GB | 2591253 A | 7/2021 |
| WO | 2022079435 A1 | 4/2022 |
| WO | 2022101608 A1 | 5/2022 |
| WO | 2022112536 A1 | 6/2022 |

OTHER PUBLICATIONS

Parker, "The Catalytic Decomposition of Ammonia," Thesis submitted in accordance with the requirement of Cardiff University for the degree of Doctor of Philosophy, Cardiff Catalysis Institute School of Chemistry, p. 1-144 (2019).

* cited by examiner

AMMONIA BASED HYDROGEN POWERED COMBINED PROPULSION SYSTEM

TECHNICAL FIELD

The present disclosure relates to an ammonia based hydrogen powered combined propulsion system.

BACKGROUND

An aircraft may include a propulsion system, such as a gas turbine engine, a ramjet engine, or a scramjet engine. Aircraft that may be designed for a high Mach number may include a combined propulsion system that includes, for example, a gas turbine engine for low Mach number operations and a ramjet engine for high Mach number operations. Such a combined propulsion system may cut off airflow to the gas turbine engine, and, generally, shutdown the gas turbine engine once the ramjet engine is ignited and operational. In addition, a petroleum-based fuel (e.g., Jet-A, Jet-B, JP-4, JP-5, kerosene, etc.) is generally used for the turbine engine, while a fuel such as hydrogen may be used for the ramjet engine. The propulsion system, therefore, may generally include separate fuel sources to store the different fuel types, and to provide the different fuels to the different engines.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 10, including

DETAILED DESCRIPTION

Figure 1:
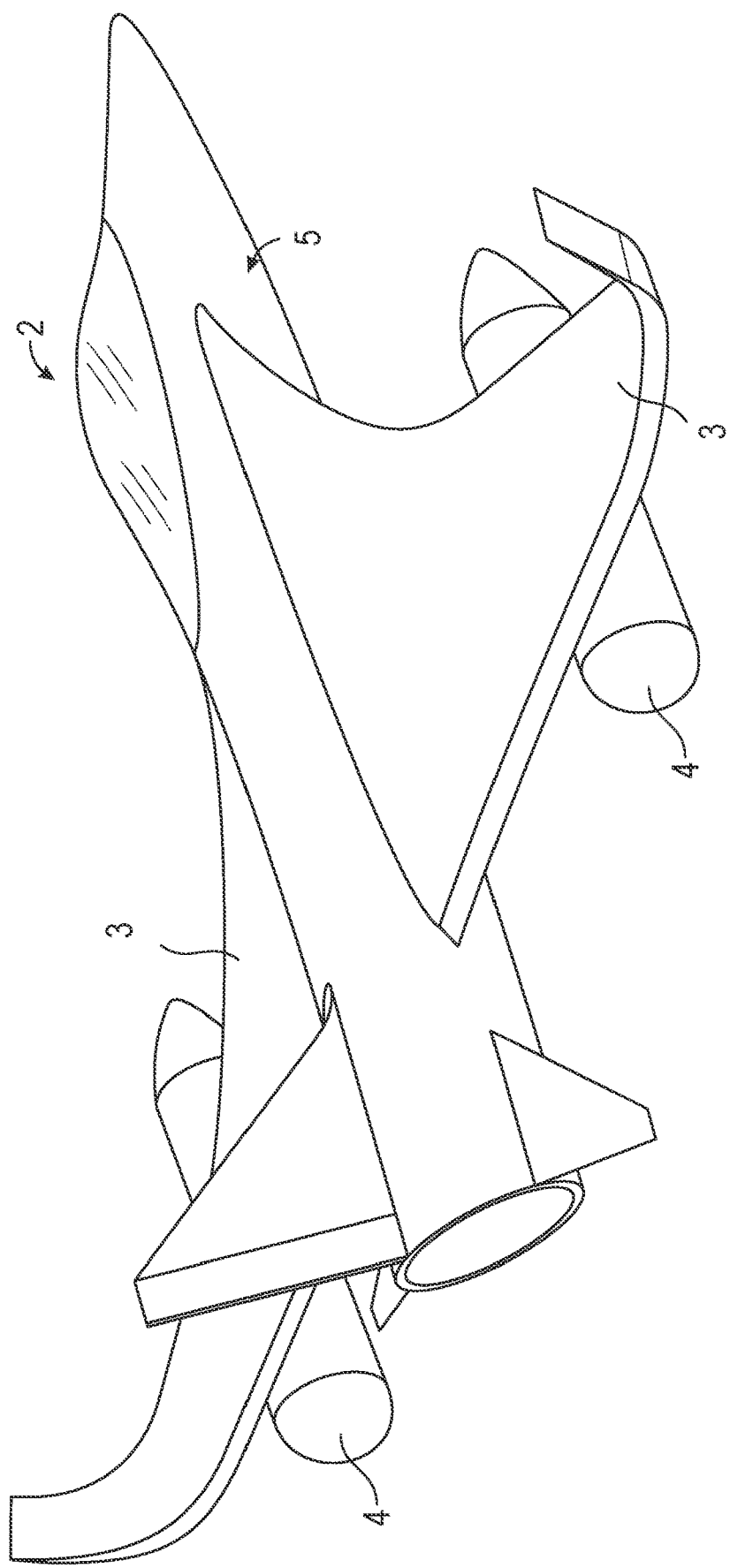
FIG. 1 is a top rear perspective view of an exemplary aircraft in which the propulsion system of the present disclosure may be implemented, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

The terms "upstream" and "downstream" refer to the relative direction with respect to fluid flow in a fluid pathway. For example, "upstream" refers to the direction from which the fluid flows, and "downstream" refers to the direction to which the fluid flows.

An aircraft may include a propulsion system, such as a gas turbine engine, a ramjet engine, or a scramjet engine. Aircraft that may be designed for a high Mach number may include a combined propulsion system that includes, for example, a gas turbine engine for low Mach number operations and a ramjet engine for high Mach number operations. Such a combined propulsion system may cut off airflow to the gas turbine engine, and, generally, shutdown the gas turbine engine once the ramjet engine is ignited and operational. In addition, a petroleum-based fuel (e.g., Jet-A, Jet-B, JP-4, JP-5, kerosene, etc.) is generally used for the turbine engine, while a fuel such as hydrogen may be used for the ramjet engine. The propulsion system, therefore, may generally include separate fuel sources to store the different fuel types, and to provide the different fuels to the different engines.

The present disclosure provides a propulsion system that includes an ammonia-based fuel (e.g., a fuel that contains nitrogen and hydrogen as its components parts, or any fuel type or liquid that can be decomposed into a burnable component for combustion and a non-burnable component that is not used for combustion) that can be used in low speed operations by the turbine engine, and can be processed within the propulsion system to obtain hydrogen and nitrogen for use by both the turbine engine and the ramjet engine in high speed operations. According to the present disclosure, the propulsion system includes a heat exchanger in which the ammonia-based fuel is heated to obtain gaseous or supercritical hydrogen and nitrogen fuel components, and a separator then separates the hydrogen fuel component and the nitrogen fuel component for use by the propulsion system. In the high speed operation, the hydrogen fuel component can be provided to the ramjet engine for ramjet combustion, and can also be provided to the turbine engine for turbine engine combustion. The nitrogen fuel component can be provided to an inlet of the turbine engine so that the nitrogen fuel component can be mixed with the hydrogen fuel component in the turbine combustor and then burned. As a result, in the high speed operating state (e.g., a flight speed of greater than Mach 2.5 and up to at least Mach 5.0), both the turbine engine and the ramjet engine may be operational, and may both operate with the use of a single ammonia-based fuel being implemented in the propulsion system. Of course, other fuel types besides an ammonia-based fuel may be implemented, so long as the fuel can be decomposed into different fuel components; one of which is burnable for combustion and the other of which may be non-burnable for combustion. In addition, liquids that may not generally be a fuel in and of itself, but that may be decomposed or processed to obtain a fuel component from the liquid may be utilized. For example, water may be processed via electrolysis to obtain hydrogen that may be utilized as a fuel component and oxygen that may be utilized for other purposes within the propulsion system.

Referring now to the drawings, FIG. 1 is a perspective top rear view of an exemplary aircraft 2 (which may also be referred to as a flight vehicle) in which the propulsion system of the present disclosure may be implemented, according to an aspect of the present disclosure. The aircraft 2 of FIG. 1 may be designed for supersonic flight operations, or may be designed for hypersonic flight operations. As shown in FIG. 1, the aircraft 2 includes at least one propulsion system 4. In FIG. 1, two propulsion systems 4 are shown as being implemented in the aircraft 2, but fewer than two, or more than two, propulsion systems 4 may be implemented instead. In addition, FIG. 1 depicts the propulsion system 4 as generally being attached to an underside of a wing 3 of the aircraft 2, but the propulsion system 4 may be embedded within the wing 3 instead, or may be embedded within a fuselage 5 of the aircraft 2.

Figure 2:
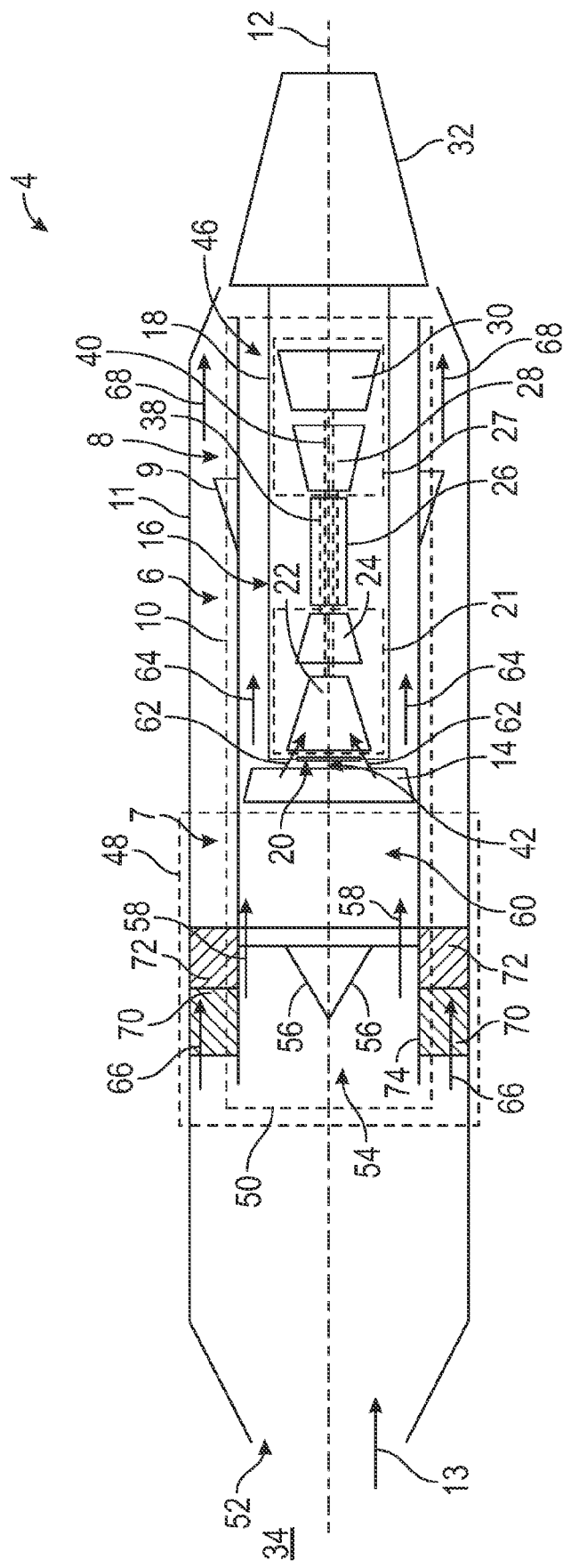
FIG. 2 is a schematic block layout of an exemplary propulsion system 4, according to an aspect of the present disclosure.

FIG. 2 is a schematic block layout of an exemplary propulsion system 4, according to an aspect of the present disclosure. The propulsion system 4 may include a ramjet engine 6 and a turbine engine 10. The turbine engine 10 may be, for example, a turbofan engine or a turbojet engine, as but a few examples. As shown in FIG. 1, propulsion system 4 has a longitudinal centerline axis 12 that extends therethrough from an upstream end 34 of the propulsion system 4 to a downstream end 36 of the propulsion system 4 for reference purposes. The longitudinal centerline axis 12 may also represent a longitudinal centerline axis of the ramjet engine 6 and/or a longitudinal centerline axis of the turbine engine 10. The ramjet engine 6 may generally be defined between an outer casing 11 of the propulsion system 4 and the turbine engine 10. The ramjet engine 6 may extend circumferentially in a circumferential direction C about the longitudinal centerline axis 12, and the ramjet engine 6 may include a ramjet inlet portion 7 and a ramjet combustor 8. However, the ramjet engine 6 need not extend circumferentially about the turbine engine 10, and may be a separate engine defined by another shape (e.g., a square or rectangular shape) extending along at least a portion of the length of the turbine engine 10 that is arranged parallel with the turbine engine 10. For example, the ramjet engine 6 may be rectangular shaped arranged either above or below the turbine engine 10 in an over/under configuration of the propulsion system 4. As will be described in more detail below, a portion of an inlet airflow 13 to the propulsion system 4 may pass through the ramjet inlet portion 7 to the ramjet combustor 8, where fuel may be injected by one or more ramjet fuel injectors 9 (two shown in FIG. 1) into the ramjet combustor 8 to mix with the air and to be ignited and burned to provide ramjet propulsion.

In FIG. 2, the turbine engine 10 is depicted as constituting a turbofan engine, and, therefore, the following description will focus on a turbofan engine being included within the propulsion system 4. The turbine engine 10 may include a fan assembly 14 and a core engine 16 disposed downstream from the fan assembly 14. The core engine 16 may generally include a core engine outer casing 18 that defines an annular inlet 20. The core engine outer casing 18 encases, in serial flow relationship, a compressor section 21 that includes a low pressure (LP) compressor 22 and a high pressure (HP) compressor 24, a combustor 26, a turbine section 27 that includes a high pressure (HP) turbine 28 and a low pressure (LP) turbine 30, and a jet exhaust nozzle section 32. The jet exhaust nozzle section 32 may be a shared nozzle that is shared between the turbine engine 10 and the ramjet engine 6. A high pressure (HP) shaft assembly 38 drivingly couples the HP turbine 28 to the HP compressor 24, and a low pressure (LP) shaft assembly 40 drivingly couples the LP turbine 30 to the LP compressor 22. Together, the low pressure compressor 22, the low pressure turbine 30, and the low pressure shaft assembly 40 may be referred to as a low pressure spool 41 that rotate together as one element. The low pressure spool 41 may further be coupled to the fan assembly 14 via a fan shaft 42, with the fan assembly 14 being arranged upstream of the compressor section 21. While not shown in FIG. 2, a reduction gearbox may be implemented within the fan shaft 42 between the low pressure compressor 22 and the fan assembly 14 so as to function as a speed reducer between the low pressure spool 41 and the fan assembly 14. Thus, in normal operation of the turbine engine 10, the low pressure spool 41 drives the fan assembly 14. A fan casing 44 circumferentially surrounds the fan assembly 14 and/or at least a portion of the core engine 16 so as to define a bypass airflow passage 46 therebetween. As an alternative configuration, the fan assembly 14 and the low pressure compressor 22 may be one and the same such that, for example, the low pressure compressor 22 may be considered as a multi-stage fan (e.g., a three stage fan).

The propulsion system 4 is further seen to include an inlet section 48 that includes the ramjet inlet portion 7 and a turbine engine inlet portion 50. As will be described below, the inlet section 48 takes in the inlet airflow 13 at a propulsion system inlet 52 and provides the inlet airflow 13 to both the ramjet engine 6 and to the turbine engine 10. In the FIG. 2 aspect, the turbine engine inlet portion 50 is shown as including an airflow restriction mechanism 54. Here, in a second (low speed) operating state (e.g., a flight speed of up to Mach 2.5, for example), the airflow restriction mechanism 54 may include a plurality of airflow inlet doors 56 that can be actuated to an open position as shown in FIG. 2 to allow a turbine inlet airflow 58 from among the inlet airflow 13 to flow through a turbine engine inlet 60 and to the fan assembly 14.

In normal operation of the turbine engine 10 at the low speed operating state, a first portion of the turbine inlet airflow 58, shown schematically as inlet airflow 62, passes through the fan assembly 14 and into the annular inlet 20 of the core engine 16. The low pressure compressor 22 and the high pressure compressor 24 compress the inlet airflow 62 to provide compressed air to the combustor 26. In the combustor 26, fuel is injected into the compressed air to generate a fuel/air mixture that is then ignited and burned to generate combustion gases. The combustion gases pass through the high pressure turbine 28, thereby supporting operation of the high pressure compressor 24, and pass through the low pressure turbine 30, thereby supporting operation of the low pressure spool 41. The combustion gases then pass through the jet exhaust nozzle section 32 to provide thrust. A second portion of the turbine inlet airflow 58, shown schematically as an inlet airflow 64, passes through the fan assembly 14 and flows through the bypass airflow passage 46 to provide thrust.

On the other hand, in the low speed operating state, another portion of the inlet airflow 13 may enter the ramjet inlet portion 7 as a ramjet inlet airflow 66. In the low speed operating state, the ramjet engine 6 may be idle and, therefore, the ramjet inlet airflow 66 may merely be a bypass airflow that flows through the ramjet combustor 8 without being mixed with fuel. Alternatively, once a predetermined Mach number has been reached (e.g., a Mach number greater than Mach 1) during the low speed operating state, the ramjet engine 6 may become operational so as to inject fuel into the ramjet combustor 8 by the ramjet fuel injector 9 and to ignite the fuel/air mixture within the ramjet combustor 8 to generate ramjet combustion products 68, thereby providing ramjet thrust.

The ramjet inlet portion 7 may include a heat exchanger 70 through which fuel passes to obtain gaseous or supercritical fuel components of the fuel that can then be separated into multiple fuel component parts for use in the propulsion system. As but one example, heat generated by compression of the ramjet inlet airflow 66 may be used as a heat source to heat the fuel passing through the heat exchanger 70. The heated fuel may then be processed by a separator 72 so as to obtain multiple different fuel components. For example, when the fuel is ammonia-based, the ammonia-based fuel is heated in the heat exchanger 70 and the separator 72 can then separate out a first fuel component (e.g., hydrogen) and a second fuel component (e.g., nitrogen) from the heated ammonia-based fuel. The first fuel component (hydrogen) can then be utilized as fuel for the ramjet engine 6 and/or to the turbine engine 10. While the separator 72 is depicted as being adjacent to the heat exchanger 70 within the ramjet inlet portion 7, this is merely for reference purposes and the separator may be arranged at other locations within the propulsion system 4.

Figure 3:
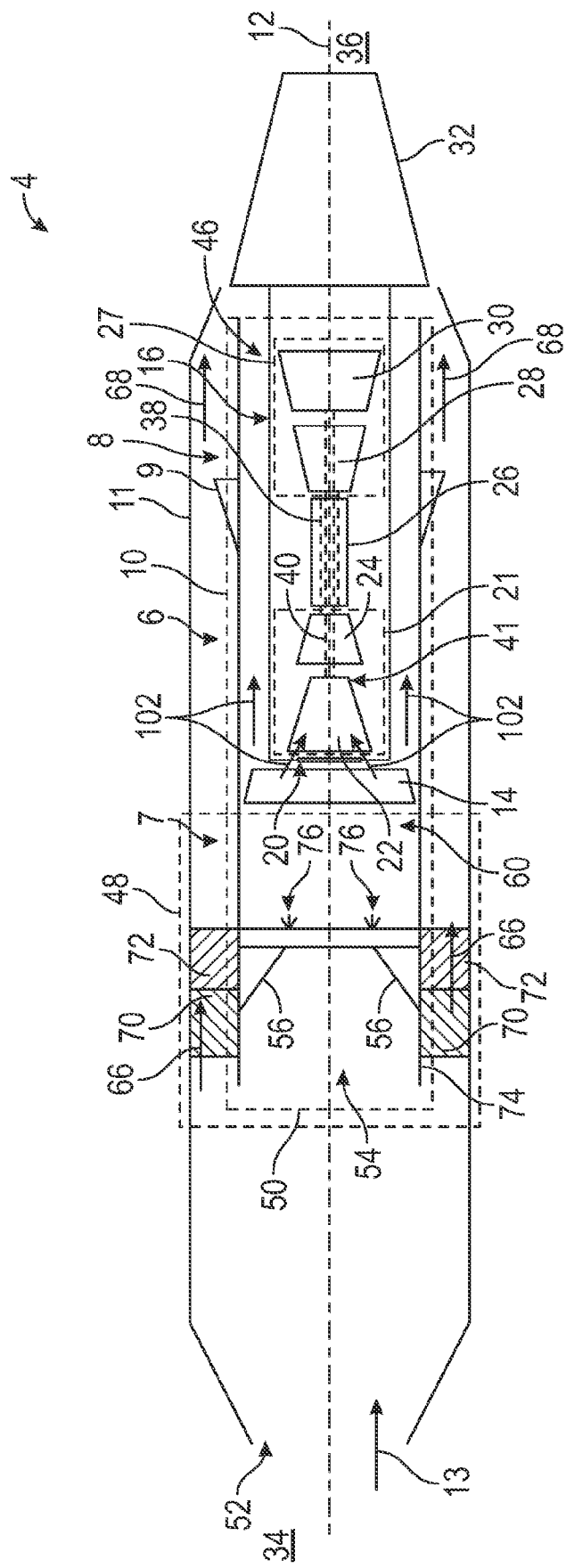
FIG. 3 is a schematic block layout of the propulsion system of FIG. 2 depicted in a high speed operating state, according to an aspect of the present disclosure.

FIG. 3 is a schematic block layout of the propulsion system of FIG. 2 depicted in a first (high speed) operating state, according to an aspect of the present disclosure. In FIG. 3, elements that are the same as those of FIG. 2 are shown with the same reference numerals. In FIG. 3, the high speed operating state may be an operating state for a flight speed of the aircraft 2 of greater than Mach 2.5, or for a flight speed of the aircraft 2 of up to Mach 5.0, for example. In FIG. 3, in the high speed operating state, the airflow inlet doors 56 are actuated to a closed state so as to engage with a turbine inlet wall 74, thereby restricting the inlet airflow 13 from passing through the turbine engine inlet 60. As will be described in more detail below, in the high speed operating state, upon separating the gaseous or supercritical fuel components to obtain the first fuel component part 98 (e.g., hydrogen), that is a burnable fuel component that may implemented for combustion, and the second fuel component part 102 (e.g., nitrogen), which is a non-burnable fuel component that may implemented for other purposes besides combustion (e.g., cooling of engine components), the second fuel component part 102 (nitrogen) may be provided to the turbine engine inlet 60 via gas nozzles 76. The second fuel component part 102 (nitrogen) may then merely flow through the bypass airflow passage 46, and through the annular inlet 20 into and through the core engine 16 so as to provide cooling to the internal component parts of the core engine 16 (e.g., to the compressor section 21, to the combustor 26, and to the turbine section 27), without combustion taking place within the combustor 26.

Figure 4:
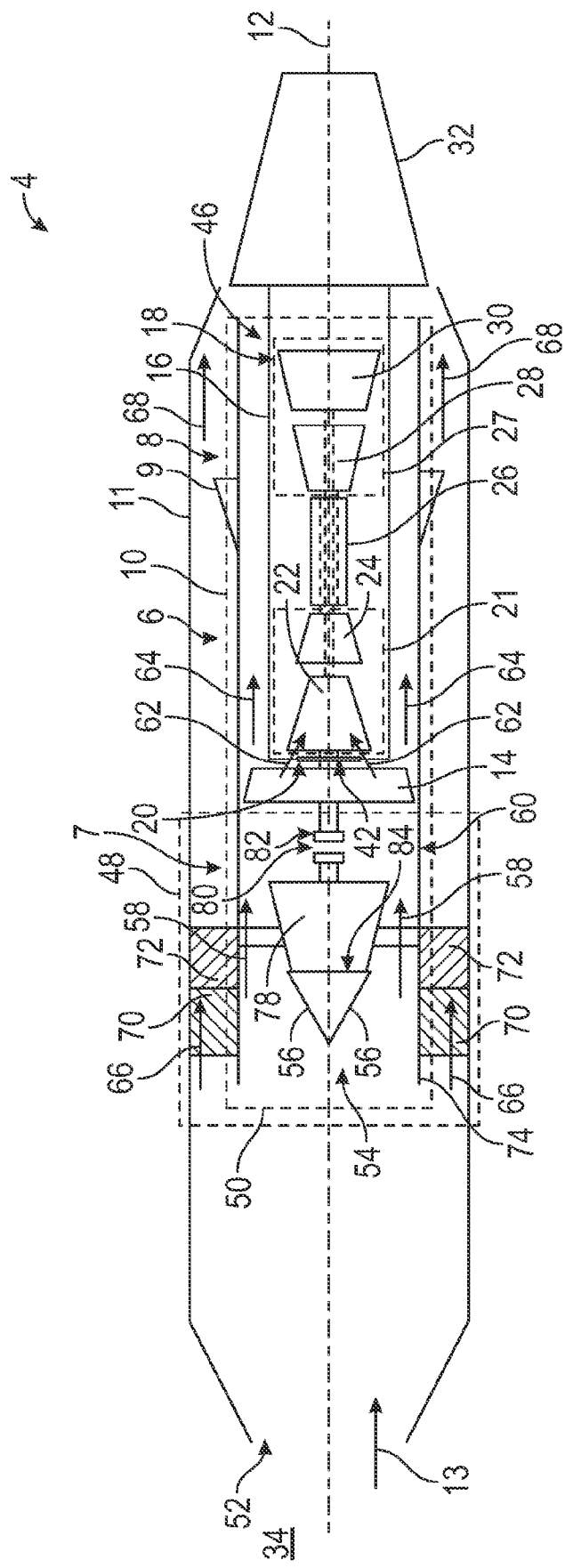
FIG. 4 is a schematic block layout of the propulsion system similar to that depicted in FIG. 2 for a low speed operating state, according to another aspect of the present disclosure.

FIG. 4 is a schematic block layout of the propulsion system similar to that depicted in FIG. 2 for a low speed operating state, according to another aspect of the present disclosure. In FIG. 4, elements that are the same as those of FIG. 2 are shown with the same reference numerals. In FIG. 4, the turbine engine inlet portion 50 may further include an expansion turbine 78 upstream of the fan assembly 14. The expansion turbine 78 may include a plurality of turbine blades (not shown) that, when airflow passes therethrough, causes the expansion turbine 78 to rotate. The expansion turbine 78 may be coupled/decoupled to/from the fan assembly 14 via a coupling drive shaft mechanism 80 that is arranged to couple/decouple the fan assembly 14 and the expansion turbine 78 to/from each other. The coupling drive shaft mechanism 80 may include, for example, a clutch device 82 that can engage/disengage to couple/decouple the expansion turbine 78 and the fan assembly 14 to/from each other. Thus, as shown in the low speed operating state of FIG. 4, the clutch device 82 may be disengaged so that the expansion turbine 78 is decoupled from the fan assembly 14, and the airflow restriction mechanism 54 may be in the open state so as to allow the turbine inlet airflow 58 to pass through to the turbine engine inlet 60 and to the fan assembly 14, but to restrict the inlet airflow 13 from entering an expansion turbine inlet 84 of the expansion turbine 78.

Figure 5:
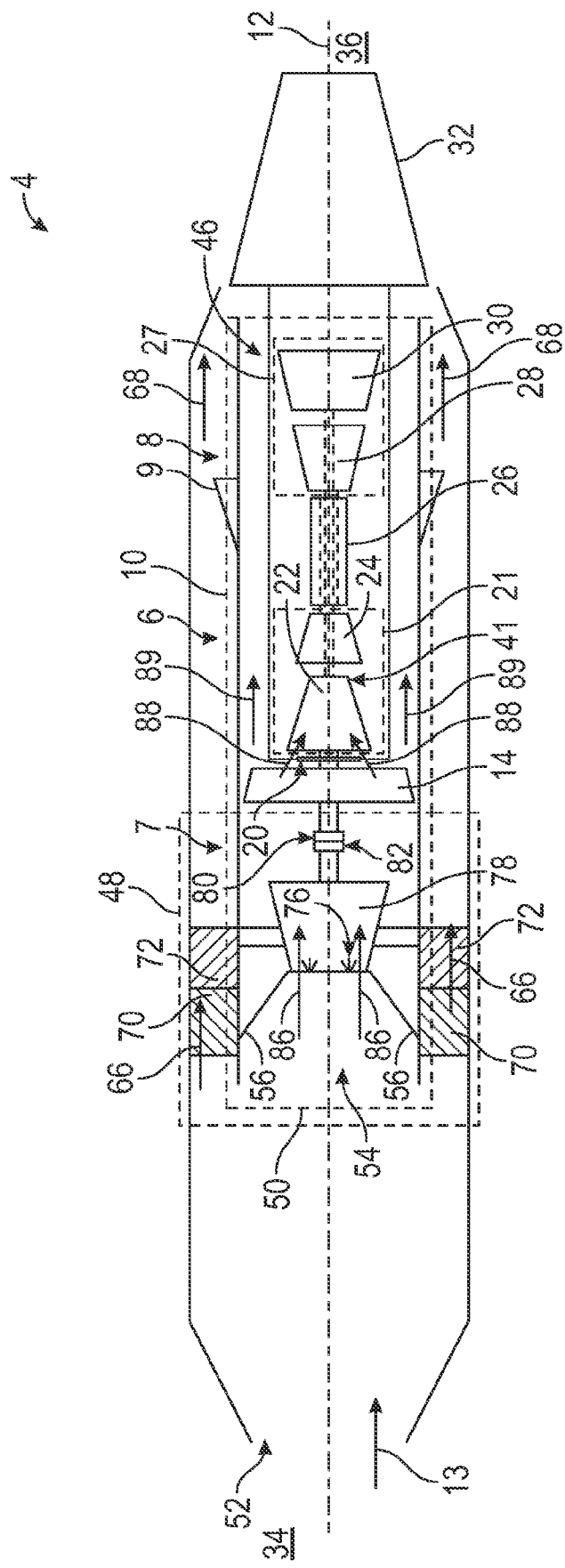
FIG. 5 is a schematic block layout of the propulsion system of FIG. 4 depicted in a high speed operating state, according to an aspect of the present disclosure.

FIG. 5 is a schematic block layout of the propulsion system of FIG. 4 depicted in a high speed operating state, according to an aspect of the present disclosure. In FIG. 5, elements that are the same as those of FIG. 4 are shown with the same reference numerals. In the high speed operating state of FIG. 5, the airflow restriction mechanism 54 is actuated to the closed state so that the inlet airflow 13 is restricted from bypassing the expansion turbine 78, and instead, an expansion turbine inlet airflow 86 is provided to the expansion turbine 78. The expansion turbine inlet airflow 86 is expanded and cooled by the expansion turbine 78 and the cooled airflow is provided to the turbine engine inlet 60 and to the fan assembly 14. In addition, the second fuel component (nitrogen) may be provided via the gas nozzles 76 to the expansion turbine 78. Thus, an inlet flow of gas 88 enters the core engine 16, and a bypass airflow 89 flows through the bypass airflow passage 46. Further, when the expansion turbine 78 is made operational to expand and to cool the expansion turbine inlet airflow 86 flowing therethrough, the coupling drive shaft mechanism 80 may be engaged so as to at least partially drive the low pressure spool 41, thereby offloading some of the load from the low pressure turbine 30 required to drive the low pressure spool 41.

Figure 6:
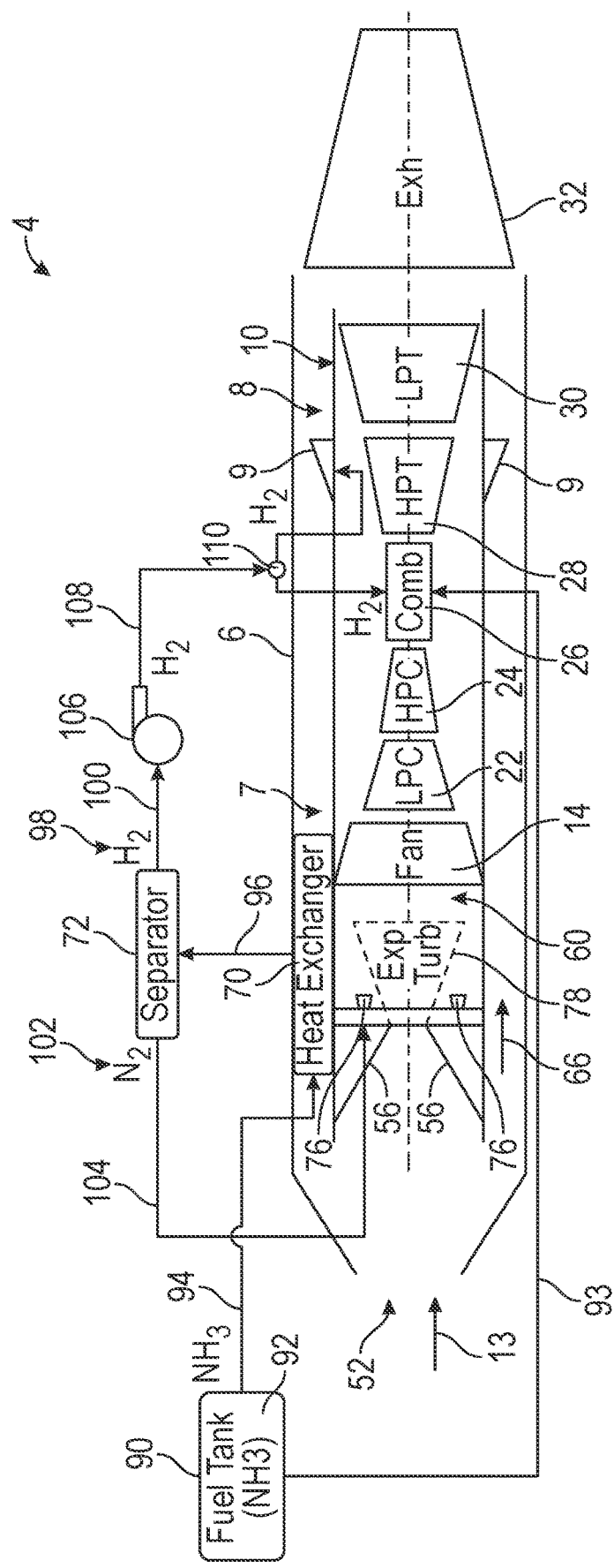
FIG. 6 is a flow diagram depicting a flow of fuel and gases through various components of the propulsion system for a high speed operating state, according to an aspect of the present disclosure.

FIG. 6 is a flow diagram depicting a flow of fuel and gases through various components of the propulsion system 4 for a high speed operating state, according to an aspect of the present disclosure. In FIG. 6, the configuration of the propulsion system 4 is similar to that shown in FIG. 5, and, therefore, common elements between the FIG. 5 aspect and the FIG. 6 aspect are labeled with the same reference numerals. In the following description of FIG. 6 to FIG. 9, the propulsion system 4 is arranged to utilize an ammonia-based fuel for the propulsion system 4, where the ammonia-based fuel is processed to obtain a hydrogen fuel component that is utilized for fuel in the ramjet engine 6 and/or in the turbine engine 10, and a nitrogen fuel component that can be utilized for cooling and/or as an inlet airflow to the turbine engine 10. As shown in FIG. 6, the propulsion system 4 includes a fuel storage tank 90 that stores a fuel 92, which, again, is an ammonia-based fuel. In the high speed operating state of FIG. 6, the fuel 92 is provided via a fuel supply line 94 to the heat exchanger 70. As was described above, the heat exchanger 70 may be arranged within the ramjet inlet portion 7 of the ramjet engine 6. Due to the high temperature of the ramjet inlet airflow 66 to the ramjet inlet portion 7, the ramjet inlet airflow 66 may heat the fuel 92 flowing through the heat exchanger 70 to as much as nine-hundred degrees Fahrenheit. The heating of the fuel 92 may thermally decompose the ammonia-based fuel 92 into gaseous or supercritical hydrogen ($H_2$) and nitrogen ($N_2$). Alternatively, the heat exchanger 70 may be arranged external to the ramjet inlet portion 7, with a ramjet bleed air from the ramjet inlet airflow 66 being bled off of the ramjet inlet airflow 66 and being provided to the heat exchanger 70 to heat the fuel 92.

The gaseous or supercritical hydrogen and nitrogen are then provided from the heat exchanger 70 to the separator 72 via a supply line 96. The separator 72 may be a membrane-type gas separator, or a centrifugal type separator, that can separate the gaseous or supercritical hydrogen and nitrogen to be output separately from the separator 72. Thus, the gaseous or supercritical hydrogen can be output by the separator 72 as a first fuel component 98 substantially constituting hydrogen ($H_2$) via an output line 100, and as a second fuel component 102 substantially constituting nitrogen ($N_2$) via a supply line 104. The first fuel component 98 ($H_2$) may then be provided to the ramjet fuel injector 9 and/or to the combustor 26 of the turbine engine 10. A fuel pump 106 and a fuel valve 110 may control a flow of the first fuel component 98 via a fuel supply line 108 to the ramjet fuel injector 9 and/or to the combustor 26 of the turbine engine 10. The second fuel component 102 ($N_2$) may be provided to the turbine engine inlet 60 via the supply line 104 and the gas nozzles 76. In the case when the expansion turbine 78 is included in the turbine engine 10, the second fuel component 102 may also be provided to an inlet of the expansion turbine 78. As a result, the turbine engine 10 may continue to operate, along with the ramjet engine 6, during the high speed operating state by virtue of the second fuel component 102 being input to the turbine engine inlet 60 and the first fuel component 98 ($H_2$) being provided to the combustor 26 of the turbine engine 10. In addition, the simplified construction of the heat exchanger 70 being located within the ramjet inlet portion 7 provides an easier way to heat the ammonia-based fuel to obtain the gaseous or supercritical hydrogen and nitrogen that can then be used to fuel both the ramjet engine 6 and the turbine engine 10 without the need for separate fuel tanks holding different fuel types.

While FIG. 6 generally relates to the high speed operating state, in FIG. 6, in the low speed operating state, the fuel 92 may be provided from the fuel storage tank 90 to the combustor 26 of the turbine engine 10 via a fuel supply line 93. In the low speed operating state, however, the airflow inlet doors 56 may be actuated to the open position as shown in either FIG. 2 or FIG. 4.

Figure 7:
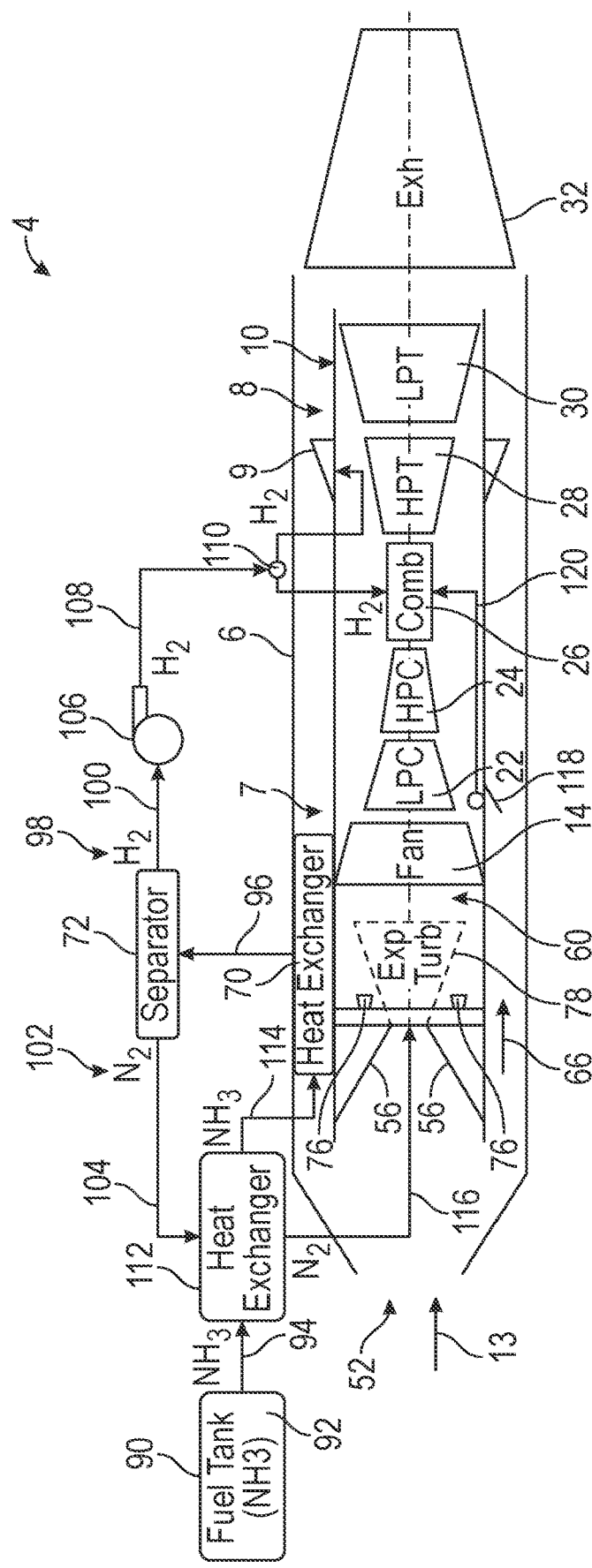
FIG. 7 is a flow diagram depicting a flow of fuel and gases through various components of the propulsion system for a high speed operating state, according to another aspect of the present disclosure.

FIG. 7 is a flow diagram depicting a flow of fuel and gases through various components of the propulsion system 4 for a high speed operating state, according to another aspect of the present disclosure. In FIG. 7, the configuration of the propulsion system 4 is similar to that shown in FIGS. 5 and 6, and, therefore, common elements among FIG. 5, FIG. 6, and FIG. 7 are labeled with the same reference numerals. The flow of the fuel and gases through the various components of the propulsion system 4 is similar to that shown in FIG. 6, but FIG. 7 further includes a second heat exchanger 112 that is arranged between the fuel storage tank 90 and the heat exchanger 70, and is also arranged between the separator 72 and the turbine engine inlet 60 of the turbine engine 10. Thus, in FIG. 7, the fuel storage tank 90 provides the fuel 92 to the second heat exchanger 112 via the fuel supply line 94 to pre-heat the fuel 92 before the fuel 92 is provided to the heat exchanger 70 from the second heat exchanger 112 via a fuel supply line 114. As a heat source for the second heat exchanger 112, heat from vehicle thermal loads or heat from engine thermal loads may be provided to the second heat exchanger 112 via an aircraft thermal management system (not shown). Other heat sources from various components of the turbine engine 10 may also be implemented to pre-heat the fuel 92 in the second heat exchanger 112. The processing by the heat exchanger 70 and the separator 72 are the same as described above for the FIG. 6 aspect. In the FIG. 7 aspect, however, the second fuel component 102 ($N_2$) from the separator 72 is provided to the second heat exchanger 112, where the second fuel component 102 may be utilized by the second heat exchanger 112 to pre-heat the fuel 92 passing therethrough. Similarly, the second fuel component 102 passing through the second heat exchanger 112 may be cooled by virtue of the fuel 92 passing through the second heat exchanger 112. In the same manner described above for FIG. 6, the second fuel component 102 is provided to the turbine engine inlet 60 of the turbine engine 10 via an output line 116, and the first fuel component 98 may be provided to the ramjet fuel injector 9 and/or to the combustor 26 of the turbine engine 10. The FIG. 7 aspect may further include a ramjet bleed air valve 118 that may provide a ramjet inlet bleed airflow of oxygenated air from the ramjet inlet airflow 66 to the combustor 26 of the turbine engine 10 via a ramjet inlet airflow bleed air passage 120. As a result, the second heat exchanger 112 may reduce the amount of heat needed by the heat exchanger 70 to obtain the gaseous or supercritical hydrogen and nitrogen, and may also provide for a colder second fuel component 102 being provided to the turbine engine inlet 60.

Figure 8:
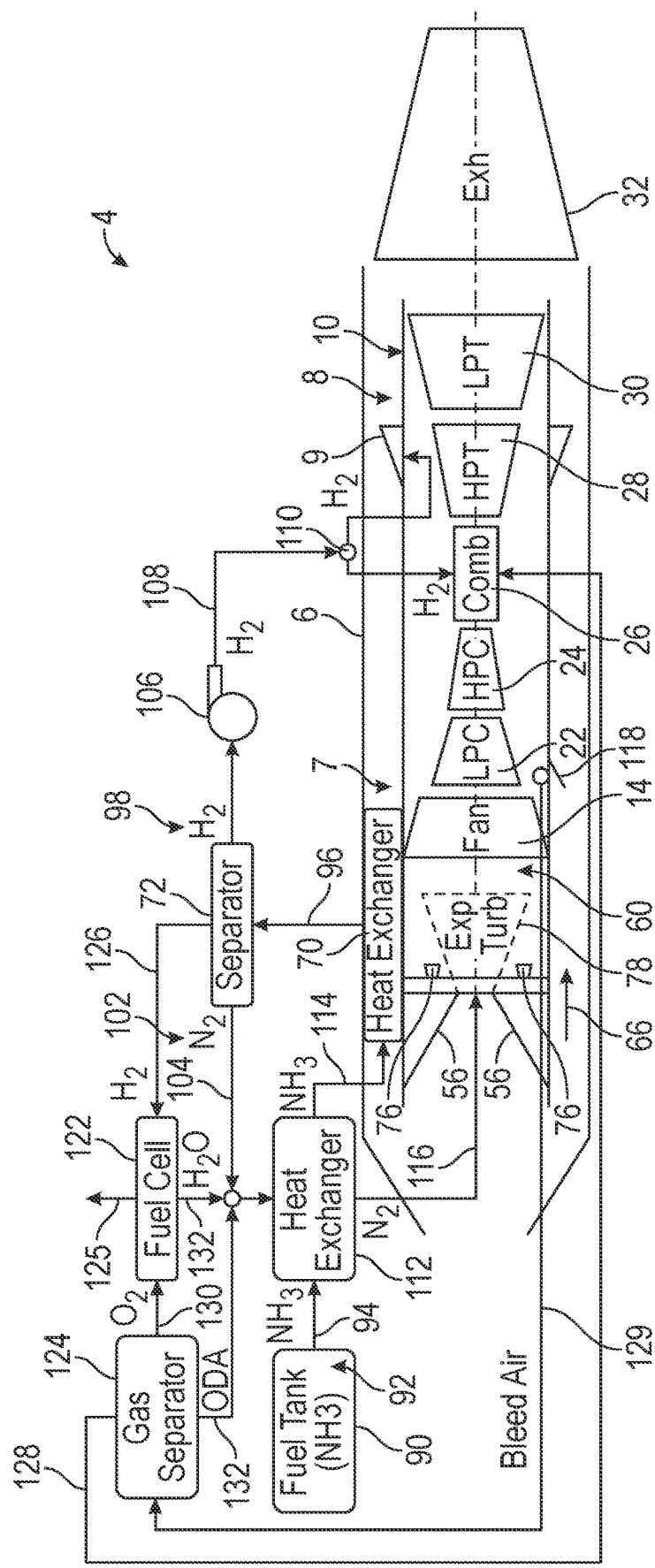
FIG. 8 is a flow diagram depicting a flow of fuel and gases through various components of the propulsion system for a high speed operating state, according to yet another aspect of the present disclosure.

FIG. 8 is a flow diagram depicting a flow of fuel and gases through various components of the propulsion system 4 for a high speed operating state, according to yet another aspect of the present disclosure. In FIG. 8, the configuration of the propulsion system 4 is similar to that shown in FIG. 7, and, therefore, common elements between FIG. 7 and FIG. 8 are labeled with the same reference numerals. The flow of the fuel and gases through the various components of the propulsion system 4 is similar to that shown in FIG. 7, but the FIG. 8 aspect further includes a fuel cell 122 and a gas separator 124. Fuel cell 122 may generate electrical power 125 by inputting hydrogen and oxygen to be processed therewithin to generate the electrical power 125 and to output water as a byproduct to the second heat exchanger 112. Thus, in FIG. 8, the separator 72 may output a portion of the first fuel component 98 ($H_2$) to the fuel cell 122 via an output line 126 to be utilized by the fuel cell 122. The gas separator 124 may be an On-Board Oxygen Generation System (OBOGS) that generates oxygen that is output to the fuel cell 122 via an output line 130 More particularly, oxygenated air, which may correspond to the ramjet inlet airflow 66, may be provided via the ramjet bleed air valve 118 and to a bleed air duct 129 to the gas separator 124. The gas separator 124 may process the oxygenated air to obtain oxygen that is provided to the fuel cell 122 via a supply line 130, and to obtain oxygen depleted air (ODA) that is provided to the second heat exchanger 112 via an output line 132. The second fuel component 102 from the separator 72, the water from the fuel cell 122, and the oxygen depleted air from the gas separator 124 are then provided to the second heat exchanger 112 and to the turbine engine inlet 60 via the output line 116. As a result, the propulsion system 4 may further be arranged to generate the electrical power 125 utilizing, at least in part, the first fuel component 98.

Figure 9:
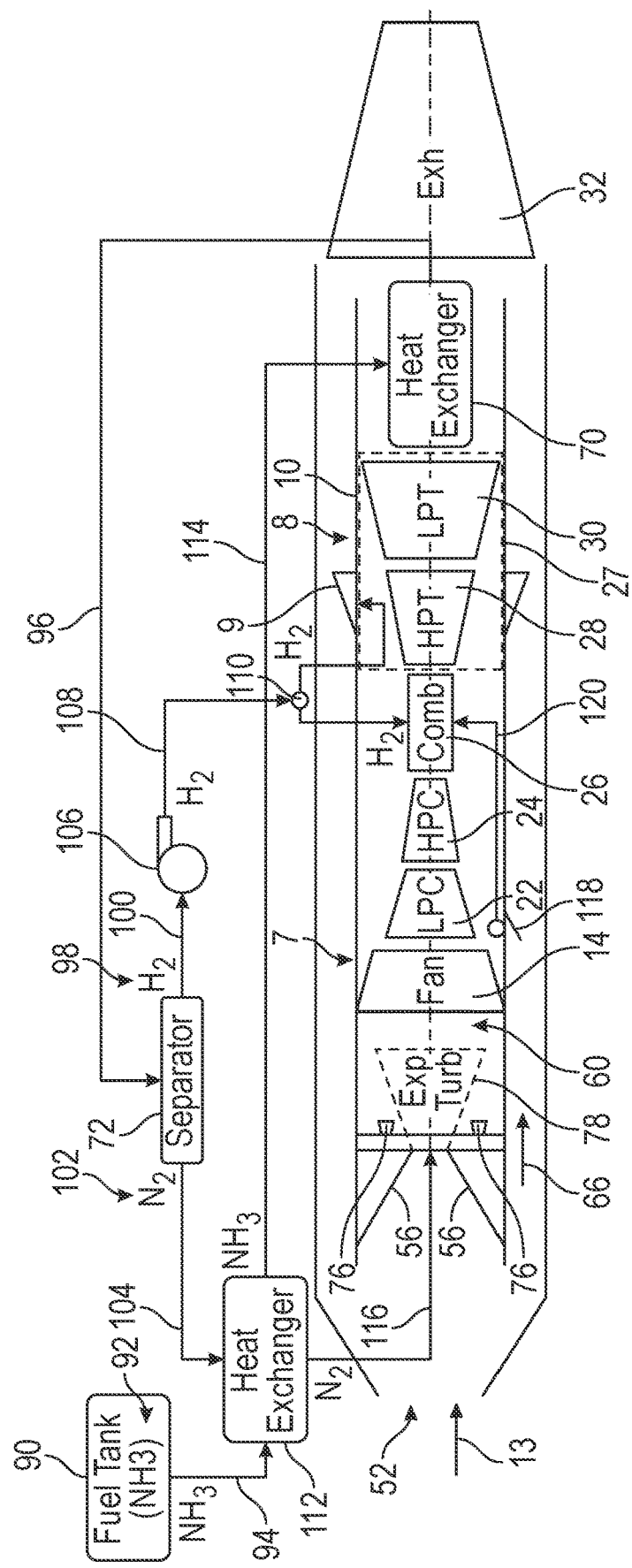
FIG. 9 is a flow diagram depicting a flow of fuel and gases through various components of the propulsion system 4 for a high speed operating state, according to still another aspect of the present disclosure.

FIG. 9 is a flow diagram depicting a flow of fuel and gases through various components of the propulsion system 4 for a high speed operating state, according to still another aspect of the present disclosure. In FIG. 9, the configuration of the propulsion system 4 is similar to that shown in FIG. 7, and, therefore, common elements between the FIG. 7 aspect and the FIG. 9 aspect are labeled with the same reference numerals. The flow of the fuel and gases through the various components of the propulsion system 4 is similar to that shown in FIG. 7, but the FIG. 7 aspect implements the heat exchanger 70 downstream of the combustor 26, such as downstream of the low pressure turbine 30 within the turbine engine 10, rather than being arranged within the ramjet inlet portion 7 of the ramjet engine 6. The heat exchanger 70 may also be arranged between the combustor 26 and the high pressure turbine 28, or may be arranged between the high pressure turbine 28 and the low pressure turbine 30, or at any other location within the turbine section 27. Thus, the FIG. 9 aspect utilizes heat from the combustion gases from the turbine engine 10 to heat the fuel 92 passing through the heat exchanger 70, rather than utilizing heat from the ramjet inlet airflow 66 to heat the fuel 92. The flow of fuel and gases in FIG. 9 is otherwise the same as that described above for FIG. 7.

Figure 10A:
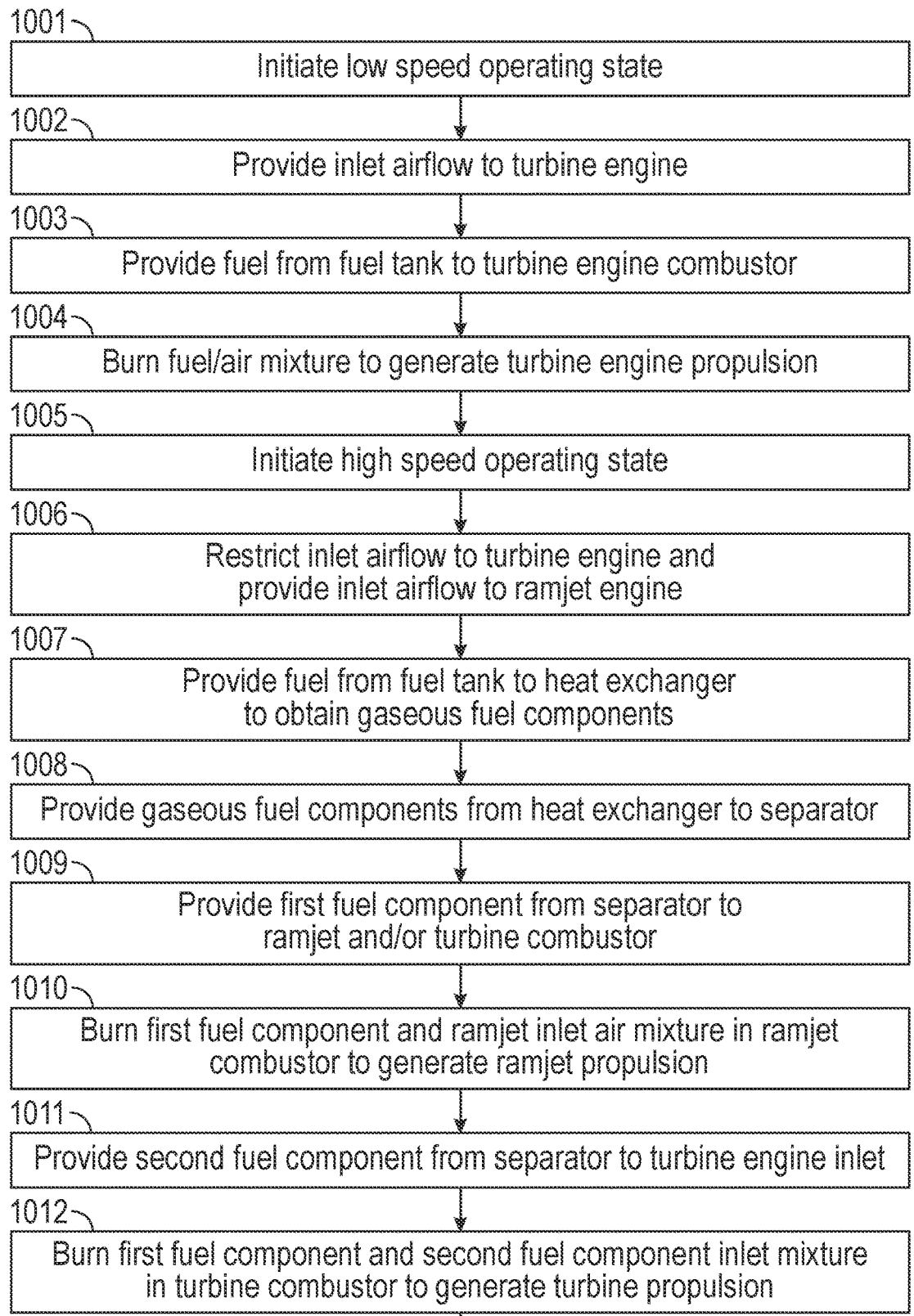
FIG. 10A and FIG. 10B, is a flowchart of process steps for a method of operating a propulsion system, according to an aspect of the present disclosure.
Figure 10B:
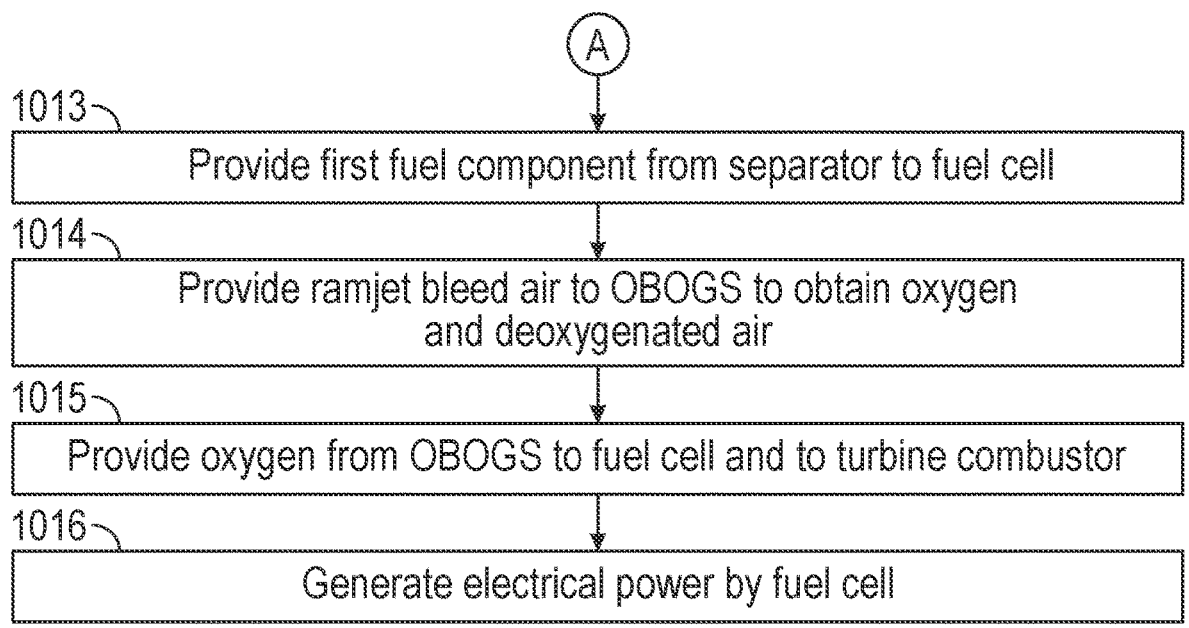

FIG. 10 is a flowchart of process steps for a method of operating a propulsion system, according to an aspect of the present disclosure. The method of operating the propulsion system 4 may be implemented in any of the foregoing aspects of FIG. 1 to FIG. 9. In addition, the method is implemented in a propulsion system 4 that utilizes an ammonia-based fuel. In the method, when the propulsion system 4 is first started-up, a low speed operating state is initiated in step 1001. In the low speed operating state, in step 1002, as shown in FIG. 2, for example, the turbine inlet airflow 58 is provided to the turbine engine inlet 60 of the turbine engine 10, and, in step 1003, as was described for FIG. 6, the fuel 92 ($NH_3$) is provided from the fuel storage tank 90 to the turbine engine combustor 26 via the fuel supply line 93. In step 1004, and as was described above for FIG. 2, a fuel/air mixture is burned within the combustor 26 to generate turbine engine propulsion. The propulsion system 4 may operate in the low speed operating state for a flight speed of the aircraft 2 up to, for example, Mach 2.5, and, then in step 1005, the high speed operating state may be initiated. Of course, the high speed operating state may be initiated at other vehicle flight speeds and the present disclosure is not limited to Mach 2.5. For example, the high speed operating state may be initiated at any flight speed between Mach 1.0 and Mach 2.5, or may be initiated at a vehicle flight speed above Mach 2.5.

In initiating the high speed operating state, the propulsion system 4 may transition from the low speed configuration shown in FIG. 2 to the high speed configuration shown in FIG. 3, for example. Thus, in step 1006, the airflow inlet doors 56 may be actuated to the closed state so as to restrict the inlet airflow 13 from flowing to the turbine engine inlet 60. In the case when the expansion turbine 78 is implemented as shown in FIG. 5, some of the inlet airflow 13 may be permitted to pass through the expansion turbine 78, but the inlet airflow 13 is otherwise restricted from bypassing the expansion turbine 78 and flowing directly to the turbine engine inlet 60. In addition, the ramjet inlet airflow 66 is provided to the ramjet inlet 7.

In step 1007, the fuel 92 is provided to the heat exchanger 70 to obtain the gaseous or supercritical fuel components (e.g., $H_2$ and $N_2$) of the fuel 92. This process may be as described above for the FIG. 6 aspect in which the fuel 92 is provided from the fuel storage tank 90 directly to the heat exchanger 70 to be heated by the ramjet inlet airflow 66, or may be as described above for the FIG. 7 aspect, where the fuel 92 is provided to the second heat exchanger 112 and then to the heat exchanger 70. As was described above for both FIGS. 6 and 7, the heating of the fuel 92 in the heat exchanger 70 results in obtaining the gaseous fuel components of the fuel 92, including the first fuel component 98 ($H_2$) and the second fuel component 102 ($N_2$). In step 1008, the fuel components (98, 102) are provided from the heat exchanger 70 to the separator 72. As was described above, the separator 72 separates the fuel components (98, 102), and in step 1009, the first fuel component 98 ($H_2$) is provided to the ramjet combustor 8 and/or to the turbine engine combustor 26. In step 1010, the first fuel component 98 is injected into the ramjet combustor 8 by the ramjet fuel injector 9, and the ramjet inlet airflow 66 is mixed in the ramjet combustor 8 with the first fuel component 98. The fuel/air mixture is then ignited and burned within the ramjet combustor 8 to generate ramjet propulsion.

As was described above with regard to the FIG. 3 aspect and the FIG. 6 aspect, for example, in the high speed operating state, the turbine engine 10 may also be made operational along with the ramjet engine 6. Thus, when the turbine engine 10 is made operational in the high speed operating state along with the ramjet engine 6, the first fuel component 98 may also be provided to the combustor 26 of the turbine engine 10 (step 1009). In addition, in step 1011, the second fuel component 102 ($N_2$) may be provided from the separator 72 to the turbine engine inlet 60 as was discussed for FIG. 6. The second fuel component 102 ($N_2$) flows through the turbine engine inlet 60 and is utilized by the turbine engine 10 in the same manner as the turbine inlet airflow 58 is utilized by turbine engine 10 as described for FIG. 2. Thus, in step 1012, the second fuel component 102 mixes in the combustor 26 with the first fuel component 98, and the mixture is burned to generate turbine engine propulsion.

In the FIG. 8 aspect, the additional components of the fuel cell 122 and the gas separator 124 were shown as being optionally included within the propulsion system 4. Thus, in the case when the fuel cell 122 and the gas separator 124 are implemented, the method may further include, in step 1013, the separator 72 providing the first fuel component 98 ($H_2$) to the fuel cell 122. In addition, as was described above for FIG. 8, in step 1014, ramjet bleed air is provided to the gas separator 124 (described above as an On-Board Oxygen Generating System) to obtain oxygen and oxygen depleted air. In step 1015, the oxygen obtained by the gas separator 124 is provided to the fuel cell 122, and may also be provided to the combustor 26 of the turbine engine 10. In step 1016, the fuel cell 122 utilizes the first fuel component 98 ($H_2$) and the oxygen from the gas separator 124 to generate the electrical power 125.

Each of the foregoing aspects provide for a propulsion system 4 that combines a ramjet engine 6 and a turbine engine 10 for high speed operations, where an ammonia-based fuel is implemented to operate by the ramjet engine 6 and the turbine engine 10. By processing the ammonia-based fuel to separate the fuel into gaseous or supercritical components, each of which can be used for different purposes within the propulsion system 4, the need for separate fuel tanks to accommodate separate fuels can be eliminated. In addition, the propulsion system 4 can operate better through a transitional speed range (e.g., a speed range from Mach 2.0 to Mach 5.0) by virtue of both the ramjet engine 6 and the turbine engine 10 being able to be operational through the speed range.

Further aspects of the present disclosure are provided by the subject matter of the following clauses.

A propulsion system comprises a turbine engine, a ramjet engine, a fuel storage tank storing a fuel, a heat exchanger through which the fuel passes to obtain gaseous fuel components of the fuel, and a separator that separates the gaseous fuel components into a first fuel component and a second fuel component, the first fuel component being provided to the ramjet engine for ramjet combustion in a first operating state of the propulsion system.

The propulsion system according to the preceding clause, the heat exchanger being provided within a ramjet inlet portion of the ramjet engine, and a ramjet inlet airflow to the ramjet inlet portion is utilized by the heat exchanger to heat the fuel passing through the heat exchanger.

The propulsion system according to any preceding clause, the heat exchanger being provided downstream of a combustor of the turbine engine, and combustion products of the turbine engine passing through the heat exchanger are utilized by the heat exchanger to heat the fuel passing through the heat exchanger.

The propulsion system according to any preceding clause, the fuel being an ammonia-based fuel, the first fuel component is hydrogen, and the second fuel component is nitrogen.

The propulsion system according to any preceding clause, the fuel being provided from the fuel storage tank to the turbine engine in a second operating state, the ramjet engine being non-operational in the second operating state.

The propulsion system according to any preceding clause, the first fuel component being further provided to the turbine engine for turbine combustion in the first operating state, and the second fuel component is provided to an inlet of the turbine engine for the turbine combustion in the first operating state.

The propulsion system according to any preceding clause, in the first operating state, both the turbine engine and the ramjet engine operating simultaneously.

The propulsion system according to any preceding clause, further comprising a second heat exchanger arranged upstream of the heat exchanger and arranged downstream of the separator.

The propulsion system according to any preceding clause, in the first operating state, the fuel being provided to the second heat exchanger to obtain a pre-heated fuel, the pre-heated fuel is provided to the heat exchanger to obtain the heated fuel, the second fuel component is provided from the separator to the second heat exchanger to obtain a cooled second fuel component, and the cooled second fuel component is provided to an inlet of the turbine engine for turbine combustion.

The propulsion system according to any preceding clause, in the first operating state, the first fuel component being provided from the separator to a ramjet combustor of the ramjet engine for ramjet combustion, and the first fuel component is provided to a turbine combustor of the turbine engine for turbine combustion.

The propulsion system according to any preceding clause, the ramjet engine further including at least one ramjet inlet airflow bleed passage that provides a ramjet inlet bleed airflow to the turbine combustor for the turbine combustion.

The propulsion system according to any preceding clause, further comprising a fuel cell, a gas separator, and at least one ramjet inlet airflow bleed passage arranged in a ramjet inlet portion of the ramjet engine, the fuel cell being arranged in flow communication with the separator, with the second heat exchanger, and with the gas separator, the gas separator being arranged in flow communication with the at least one ramjet inlet airflow bleed passage, with the fuel cell, with the second heat exchanger, and with the turbine combustor of the turbine engine.

The propulsion system according to any preceding clause, the separator providing the first fuel component to the fuel cell, the gas separator provides oxygen to the fuel cell and to the turbine combustor, and provides an oxygen depleted gas to the second heat exchanger, and the fuel cell generates electrical power and provides a byproduct to the second heat exchanger.

The propulsion system according to any preceding clause, the turbine engine including a turbine inlet portion, the turbine inlet portion including an inlet airflow restriction mechanism that, in the first operating state, is actuated to restrict an inlet airflow to the turbine engine, and, in a second operating state, is actuated to permit the inlet airflow to the turbine engine.

The propulsion system according to any preceding clause, the turbine inlet portion including an expansion turbine arranged upstream of a fan assembly of the turbine engine, the separator providing the second fuel component to the expansion turbine in the first operating state.

A method of operating a propulsion system, the propulsion system including (a) a turbine engine, (b) a ramjet engine, (c) a fuel storage tank storing a fuel, (d) a heat exchanger through which the fuel passes to obtain a gaseous fuel components of the fuel, and (e) a separator that separates the gaseous fuel components into a first fuel component and a second fuel component, the method comprising, in a first operating state of the propulsion system, (i) restricting, via an inlet airflow restriction mechanism, an inlet airflow to a turbine engine inlet of the turbine engine, (ii) providing a ramjet inlet airflow to a ramjet inlet of the ramjet engine, (iii) providing the fuel to the heat exchanger to obtain gaseous fuel components of the fuel, (iv) providing the gaseous fuel components from the heat exchanger to the separator to obtain the first fuel component and the second fuel component, (v) providing the first fuel component to a ramjet combustor of the ramjet engine, and (vi) burning a second fuel/gas mixture within the ramjet combustor to generate ramjet engine propulsion, and, in a second operating state of the propulsion system, (vii) providing an inlet airflow to an inlet of the turbine engine, (viii) providing the fuel from the fuel storage tank to a turbine combustor of the turbine engine, and (ix) burning a first fuel/gas mixture within the turbine combustor to generate turbine engine propulsion.

The method according to any preceding clause, the heat exchanger being provided in one of the ramjet inlet such that the ramjet inlet airflow is utilized by the heat exchanger to obtain the gaseous fuel components, or is provided downstream of the turbine combustor such that the heat exchanger utilizes combustion products of the turbine combustion to obtain the gaseous fuel components.

The method according to any preceding clause, in the first operating state, the first fuel component being further provided from the separator to the turbine combustor, and the second fuel component is provided to the inlet of the turbine engine, the turbine engine burning a third fuel/gas mixture within the turbine combustor to generate turbine engine propulsion.

The method according to any preceding clause, the propulsion system further including (f) a second heat exchanger arranged upstream of the heat exchanger and downstream of the separator, and, further, in the first operating state of the propulsion system, (x) providing the fuel to the second heat exchanger to obtain a pre-heated fuel, (xi) providing the pre-heated fuel to the heat exchanger to obtain the heated fuel, (xii) providing the second fuel component from the separator to the second heat exchanger to obtain a cooled second fuel component, and (xiii) providing the cooled second fuel component from the second heat exchanger to the inlet of the turbine engine.

The propulsion system according to any preceding clause, the propulsion system further including (g) a fuel cell, (h) a gas separator, and (j) at least one ramjet inlet airflow bleed passage arranged in an inlet duct of the ramjet engine, the method further comprising (xiv) providing the first fuel component from the separator to the fuel cell, (xv) providing oxygenated air from the at least ramjet inlet airflow bleed passage to the gas separator, (xvi) providing oxygen from the gas separator to the fuel cell, (xvii) generating, by the fuel cell, electrical power, (xviii) providing the oxygen from the gas separator to the turbine combustor, and (xix) providing oxygen depleted air from the gas separator to the second heat exchanger.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A propulsion system comprising:
    a turbine engine having a turbine engine inlet including an inlet airflow restriction mechanism that controls an inlet airflow to the turbine engine inlet, and a turbine engine combustor;
    a ramjet engine having a ramjet inlet portion and a ramjet combustor;
    a fuel storage tank storing an ammonia-based fuel;
    a heat exchanger provided within the ramjet inlet portion, the ammonia-based fuel flowing through the heat exchanger to heat the ammonia-based fuel to obtain gaseous fuel components of the ammonia-based fuel; and
    a separator that separates the gaseous fuel components into a first fuel component substantially constituting hydrogen to be delivered to at least the ramjet combustor and turbine engine combustor and a second fuel component substantially constituting nitrogen to be provided to the turbine engine inlet,
    wherein, in a first operating state of the propulsion system, the first fuel component substantially constituting hydrogen is provided to the ramjet combustor for ramjet combustion, and the second fuel component substantially constituting nitrogen is provided to the turbine engine inlet of the turbine engine.

2. The propulsion system according to claim 1, wherein a ramjet inlet airflow to the ramjet inlet portion is utilized by the heat exchanger to heat the ammonia-based fuel flowing through the heat exchanger.

3. The propulsion system according to claim 1, wherein, in the first operating state, the inlet airflow restriction mechanism is controlled to restrict the inlet airflow from flowing into the turbine engine inlet, the second fuel component substantially constituting nitrogen being provided to the turbine engine inlet to provide cooling to the turbine engine.

4. The propulsion system according to claim 1, wherein, in a second operating state of the propulsion system, the ammonia-based fuel is provided from the fuel storage tank to the turbine engine combustor, the ramjet engine being non-operational in the second operating state.

5. The propulsion system according to claim 1, further comprising a second heat exchanger arranged upstream of the heat exchanger and arranged downstream of the separator.

6. The propulsion system according to claim 5, wherein, in the first operating state, the ammonia-based fuel is provided to the second heat exchanger to obtain a pre-heated fuel, the pre-heated fuel is provided to the heat exchanger to obtain the gaseous fuel components, the second fuel component substantially constituting nitrogen is provided from the separator to the second heat exchanger to obtain a cooled second fuel component, and the cooled second fuel component is provided to the turbine engine inlet.

7. The propulsion system according to claim 6, wherein, in the first operating state, the first fuel component substantially constituting hydrogen is provided from the separator to the ramjet combustor of the ramjet engine for ramjet combustion, and the first fuel component substantially constituting hydrogen is provided to the turbine engine combustor of the turbine engine for turbine combustion.

8. The propulsion system according to claim 7, wherein the ramjet engine further includes at least one ramjet inlet airflow bleed air passage that provides a ramjet inlet bleed airflow to the turbine engine combustor for turbine combustion.

9. The propulsion system according to claim 7, further comprising a fuel cell, a gas separator, and at least one ramjet inlet airflow bleed air passage that is arranged in the ramjet inlet portion of the ramjet engine, the fuel cell being arranged in flow communication with the separator, with the second heat exchanger, and with the gas separator, the gas separator being arranged in flow communication with the at least one ramjet inlet airflow bleed air passage, with the fuel cell, with the second heat exchanger, and with the turbine engine combustor of the turbine engine.

10. The propulsion system according to claim 9, wherein the separator provides the first fuel component substantially constituting hydrogen to the fuel cell, the gas separator provides oxygen to the fuel cell and to the turbine engine combustor, and provides an oxygen depleted gas to the second heat exchanger, and the fuel cell generates electrical power and provides a byproduct to the second heat exchanger.

11. The propulsion system according to claim 1, wherein the inlet airflow restriction mechanism that, in the first operating state, is actuated to restrict an inlet airflow to the turbine engine, and, in a second operating state, is actuated to permit the inlet airflow to the turbine engine.

12. The propulsion system according to claim 1, wherein the turbine engine inlet includes an expansion turbine arranged, the separator providing the second fuel component substantially constituting nitrogen to the expansion turbine in the first operating state.

13. The propulsion system according to claim 12, wherein, in the first operating state, the inlet airflow restriction mechanism is actuated to restrict the inlet airflow to flow through the expansion turbine to generate a cooled inlet airflow within the turbine engine inlet, the cooled inlet airflow mixing with the second fuel component substantially constituting nitrogen provided to the expansion turbine by the separator, and the first fuel component substantially constituting hydrogen is further provided to the turbine engine combustor for turbine combustion.

14. The propulsion system according to claim 13, wherein, in the first operating state, both the turbine engine and the ramjet engine operate simultaneously.

15. A method of operating a propulsion system, the propulsion system including (a) a turbine engine having a turbine engine inlet including an inlet airflow restriction mechanism that controls an inlet airflow to the turbine engine inlet, and a turbine engine combustor, (b) a ramjet engine having a ramjet inlet portion and a ramjet combustor, (c) a fuel storage tank storing an ammonia-based fuel, (d) a heat exchanger arranged within the ramjet inlet portion, the ammonia-based fuel flowing through the heat exchanger to heat the ammonia-based fuel to obtain gaseous fuel components of the ammonia-based fuel, and (e) a separator that separates the gaseous fuel components into a first fuel component substantially constituting hydrogen to be delivered to at least the ramjet combustor and turbine engine combustor and a second fuel component substantially constituting nitrogen to be provided to the turbine engine inlet, the method comprising:
  in a first operating state of the propulsion system:
  (i) restricting, via the inlet airflow restriction mechanism, the inlet airflow to the turbine engine inlet of the turbine engine;
  (ii) providing a ramjet inlet airflow to the ramjet inlet portion of the ramjet engine;
  (iii) providing the ammonia-based fuel to the heat exchanger and heating the ammonia-based fuel by the heat exchanger to obtain the gaseous fuel components of the ammonia-based fuel;
  (iv) providing the gaseous fuel components from the heat exchanger to the separator to obtain the first fuel component substantially constituting hydrogen and the second fuel component substantially constituting nitrogen;
  (v) providing the first fuel component substantially constituting hydrogen to the ramjet combustor of the ramjet engine;
  (vi) providing the second fuel component substantially constituting nitrogen to the turbine engine inlet of the turbine engine; and
  (vii) burning the first fuel component substantially constituting hydrogen within the ramjet combustor to generate ramjet engine propulsion, and
  in a second operating state of the propulsion system:
  (viii) providing, via the inlet airflow restriction mechanism, the inlet airflow to the turbine engine inlet of the turbine engine;
  (ix) providing the ammonia-based fuel from the fuel storage tank to the turbine engine combustor of the turbine engine; and
  (x) burning the ammonia-based fuel within the turbine engine combustor to generate turbine engine propulsion.

16. The method according to claim 15, wherein the ramjet inlet airflow is utilized by the heat exchanger to obtain the gaseous fuel components.

17. The method according to claim 15, wherein, the turbine engine inlet includes an expansion turbine, and in the first operating state, the first fuel component substantially constituting hydrogen is further provided from the separator to the turbine engine combustor, and the second fuel component substantially constituting nitrogen is provided to the expansion turbine, the turbine engine burning the first fuel component substantially constituting hydrogen within the turbine engine combustor to generate turbine engine propulsion.

18. The method according to claim 15, wherein the propulsion system further includes (f) a second heat exchanger arranged upstream of the heat exchanger and downstream of the separator, and, further, in the first operating state of the propulsion system:
  (xi) providing the ammonia-based fuel to the second heat exchanger to obtain a pre-heated fuel;
  (xii) providing the pre-heated fuel to the heat exchanger to obtain the gaseous fuel components;
  (xiii) providing the second fuel component substantially constituting nitrogen from the separator to the second heat exchanger to obtain a cooled second fuel component; and
  (xiv) providing the cooled second fuel component from the second heat exchanger to the turbine engine inlet of the turbine engine.

19. The propulsion system according to claim 18, wherein the propulsion system further includes (g) a fuel cell, (h) a gas separator, and (j) at least one ramjet inlet airflow bleed air passage arranged in an inlet duct of the ramjet engine, the method further comprising:
  (xv) providing the first fuel component substantially constituting hydrogen from the separator to the fuel cell;
  (xvi) providing oxygenated air from the at least one ramjet inlet airflow bleed air passage to the gas separator;
  (xvii) providing oxygen from the gas separator to the fuel cell;
  (xviii) generating, by the fuel cell, electrical power;
  (xix) providing the oxygen from the gas separator to the turbine engine combustor; and
  (xx) providing oxygen depleted air from the gas separator to the second heat exchanger.

* * * * *